United States Patent
Hasegawa et al.

(10) Patent No.: US 12,164,145 B2
(45) Date of Patent: Dec. 10, 2024

(54) OPTICAL FIBER AND METHOD FOR PRODUCING OPTICAL FIBER

(71) Applicant: SUMITOMO ELECTRIC INDUSTRIES, LTD., Osaka (JP)

(72) Inventors: Takemi Hasegawa, Osaka (JP); Yuki Kawaguchi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/928,751

(22) PCT Filed: May 18, 2021

(86) PCT No.: PCT/JP2021/018826
§ 371 (c)(1),
(2) Date: Nov. 30, 2022

(87) PCT Pub. No.: WO2021/251074
PCT Pub. Date: Dec. 16, 2021

(65) Prior Publication Data
US 2023/0228937 A1    Jul. 20, 2023

(30) Foreign Application Priority Data

Jun. 11, 2020 (JP) ................. 2020-101719

(51) Int. Cl.
*G02B 6/036* (2006.01)
*C03B 37/027* (2006.01)
*G02B 6/02* (2006.01)

(52) U.S. Cl.
CPC .... *G02B 6/03622* (2013.01); *C03B 37/02736* (2013.01); *C03B 37/02763* (2013.01); *G02B 6/02071* (2013.01); *G02B 6/03694* (2013.01)

(58) Field of Classification Search
CPC .......... G02B 6/03694; C03B 37/02763; C03B 2203/06
See application file for complete search history.

(56) References Cited

U.S. PATENT DOCUMENTS 5,267,339 A * 11/1993 Yamauchi ................ G02B 6/02
385/146
10,294,146 B2 * 5/2019 Li ...................... G02B 6/03633
(Continued)

FOREIGN PATENT DOCUMENTS

JP    H11-510619 A    9/1999
JP    2001-209081 A   8/2001
(Continued)

OTHER PUBLICATIONS

Bolshtyansky, M. A., et al., "Impact of Spontaneous Guided Acoustic-Wave Brillouin Scattering on Long-haul Transmission," OFC 2018, M4B.3 (2018).
Horiguchi, T., et al. "Tensile Strain Dependence of Brillouin Frequency Shift in Silica Optical Fibers," IEEE Photonics Technology Letters, vol. 1, No. 5, pp. 107-108 (1989).
(Continued)

*Primary Examiner* — Omar R Rojas
(74) *Attorney, Agent, or Firm* — Faegre Drinker Biddle & Reath LLP (57) ABSTRACT

An optical fiber has a central axis. The optical fiber includes a core made of silica glass and extending along the central axis, a cladding made of silica glass and surrounding the core, the cladding extending along the central axis, and a coating layer made of resin and surrounding the cladding, the coating layer extending along the central axis. An outer diameter of the cladding varies along the central axis. A residual stress in a direction along the central axis varies along the central axis, the residual stress being averaged over the core and the cladding in a cross section perpendicular to the central axis. A deviation from an average value (Continued)

of the outer diameter and a deviation from an average value of the residual stress have signs opposite to each other.

9 Claims, 10 Drawing Sheets

(56) References Cited

U.S. PATENT DOCUMENTS

| | | |
|---|---|---|
| 2001/0010585 A1 | 8/2001 | Nishimura et al. |
| 2002/0178762 A1 | 12/2002 | Foster et al. |
| 2008/0267229 A1 | 10/2008 | Kojima et al. |
| 2014/0369658 A1 | 12/2014 | Hoshino |
| 2015/0285994 A1* | 10/2015 | Okada .................. C03C 25/104 65/382 |
| 2018/0057396 A1 | 3/2018 | Li et al. |

FOREIGN PATENT DOCUMENTS

| | | |
|---|---|---|
| JP | 2008-273769 A | 11/2008 |
| JP | 2015-001741 A | 1/2015 |
| WO | WO-97/006457 A1 | 2/1997 |
| WO | WO-02/032820 A2 | 4/2002 |

OTHER PUBLICATIONS

Paskov, M., et al., "Observation and Compensation of Guided Acoustic-Wave Brillouin Scattering in Modulated Channels," OFC 2019, Tu3J.3 (2019).

Shelby, R. M., et al., "Guided acoustic-wave Brillouin scattering," Physical Review B, vol. 31, No. 8, pp. 5244-5252 (1985).

Yablon, Andrew D., "Advanced Fiber Characterization Technologies for Fiber Lasers and Amplifiers," Advanced Solid State Lasers (ASSL), ATh2A.45 (2014).

* cited by examiner

OPTICAL FIBER AND METHOD FOR PRODUCING OPTICAL FIBER

TECHNICAL FIELD

The present disclosure relates to an optical fiber and a method of manufacturing the optical fiber. The present application claims priority to Japanese Patent Application No. 2020-101719 filed on Jun. 11, 2020, and the entire contents of the Japanese patent application are incorporated herein by reference.

BACKGROUND ART

Non-Patent Document 1 to 3 disclose optical fibers used for long-distance transmission such as submarine optical cable transmission.

CITATION LIST

Non-Patent Literature

[Non-Patent Document 1] R. M. Shelby et al., "Guided acoustic-wave Brillouin scattering", Physical Review B, vol. 31, no. 8, p 5244 (1985)

[Non-Patent Document 2] M. A. Bolshtyansky et al., "Impact of Spontaneous Guided Acoustic-Wave Brillouin Scattering on Long-haul Transmission", OFC2018, M4B 0.3 (2018)

[Non-Patent Document 3] M. Paskov et al., "Observation and Compensation of Guided Acoustic-Wave Brillouin Scattering in Modulated Channels", OFC2019, Tu3J.3 (2019)

[Non-Patent Document 4] T. Horiguchi et al. "Tensile strain dependence of Brillouin frequency shift in silica optical fibers", IEEE Photonics Technology Letters vol. 1, no. 5, p. 107 (1989)

[Non-Patent Document 5] Andrew D Yablon, "Advanced Fiber Characterization Technologies for Fiber Lasers and Amplifiers", Advanced Solid State Lasers (ASSL), ATh2A.45 (2014).

SUMMARY OF INVENTION

An optical fiber according to an embodiment of the present disclosure has a central axis. The optical fiber includes a core made of silica glass and extending along the central axis, a cladding made of silica glass and surrounding the core, the cladding extending along the central axis, and a coating layer made of resin and surrounding the cladding, the coating layer extending along the central axis. An outer diameter of the cladding varies along the central axis. A residual stress in a direction along the central axis varies along the central axis, the residual stress being averaged over the core and the cladding in a cross section perpendicular to the central axis. A deviation from an average value of the outer diameter and a deviation from an average value of the residual stress have signs opposite to each other.

A method of manufacturing an optical fiber according to an embodiment of the present disclosure includes heating a distal end portion of an optical fiber preform made of glass, drawing a glass fiber from the distal end portion softened by the heating, and forming a coating layer made of resin on the glass fiber to form an optical fiber. The drawing includes periodically varying a tension that is applied to the glass fiber to vary a diameter of the glass fiber and a residual stress in an axial direction of the glass fiber so as to be in phases opposite to each other along the axial direction.

DETAILED DESCRIPTION OF THE PREFERRED EMBODIMENTS

[Problems to be Solved by the Present Disclosure]

In optical fibers used for long-distance transmission, in addition to spontaneous emission noise of optical amplifiers and nonlinear noise due to nonlinear optical effects in the optical fibers, noise due to Guided Acoustic Wave Brillouin Scatter (GAWBS) due to a guided acoustic wave is a cause of deterioration in transmission characteristics.

Non-Patent Document 1 discloses GAWBS as follows. That is, in an optical fiber formed of glass, a waveguide mode of an acoustic wave is generated inside the optical fiber by reflection on the outer peripheral surface of the glass. GAWBS is a phenomenon in which a thermally excited waveguide mode randomly scatters light propagating through a core of an optical fiber. The frequency spectrum of the scattered light by GAWBS has a plurality of discrete peaks centered on the frequency of the original light. A center frequency of each peak corresponds to the waveguide mode of the acoustic wave. The frequency shift from the frequency of the original light is from 20 MHz to 800 MHz. The line width of the peak is from 165 kHz to 1000 kHz.

Non-Patent Document 2 discloses that when signal light is transmitted over a long distance by an optical fiber, signal light scattered by GAWBS is accumulated as noise, and thus GAWBS has a non-negligible effect on a signal-to-noise ratio.

Therefore, it is an object of the present disclosure to provide an optical fiber and a method of manufacturing the optical fiber capable of improving long-distance transmission performances by suppressing GAWBS.

[Effects of the Present Disclosure]

According to the present disclosure, it is possible to suppress GAWBS and improve long-distance transmission performances.

[Description of Embodiments of the Present Disclosure]

First, embodiments of the present disclosure will be listed and described. An optical fiber according to an embodiment has a central axis. The optical fiber includes a core made of silica glass and extending along the central axis, a cladding made of silica glass and surrounding the core, the cladding extending along the central axis, and a coating layer made of resin and surrounding the cladding, the coating layer extending along the central axis. An outer diameter of the cladding varies along the central axis. A residual stress in a direction along the central axis varies along the central axis, the residual stress being averaged over the core and the cladding in a cross section perpendicular to the central axis. A deviation from an average value of the outer diameter and a deviation from an average value of the residual stress have signs opposite to each other.

In the optical fiber according to the above embodiment, it is possible to effectively expand a line width of a peak in a frequency spectrum of scattered light due to GAWBS. Thus, GAWBS can be suppressed. As a result, the transmission performance in long-distance transmission can be improved.

The outer diameter and the residual stress may vary along the central axis so as to be in phases opposite to each other. In this case, the deviation from the average value of the outer diameter of the cladding and the deviation from the average value of the residual stress can have signs opposite to each other.

When monochromatic light propagates through the core, a line width of a peak of a frequency spectrum of scattered light that is scattered forward by an acoustic wave thermally excited in the optical fiber and that propagates through the core may be more than 1.5 MHz. In this case, according to the relationship between SNR (signal-to-noise ratio) decrease and the line width disclosed in Non-Patent Document 3, SNR decrease due to GAWBS can be effectively suppressed.

Following expressions may be satisfied substantially over an entire length, where $\delta f$ denotes the deviation of the outer diameter and $\delta\sigma$ denotes the deviation of the residual stress.

$$|\delta f/[\mu m] - 0.0078 \cdot (\delta\sigma/[MPa])| \geq 0.125, |\delta f/[\mu m]| \leq 1, |(\delta\sigma/[MPa])| \leq 150 \quad [\text{Math. 1}]$$

When the above expressions are satisfied in 99% or more of the points randomly extracted from the entire length of the optical fiber, it is equivalent to that the above expressions are satisfied substantially in the entire length. Further, it is more preferable that the above expressions are satisfied in 99.9% or more of points randomly extracted from the entire length. In this case, adverse effects due to excessive deviation of the cladding outer diameter and excessive deviation of the residual stress can be suppressed.

A method of manufacturing an optical fiber according to an embodiment includes heating a distal end portion of an optical fiber preform made of glass, drawing a glass fiber from the distal end portion softened by the heating, and forming a coating layer made of resin on the glass fiber to form an optical fiber. The drawing includes periodically varying a tension that is applied to the glass fiber to vary a diameter of the glass fiber and a residual stress in an axial direction of the glass fiber so as to be in phases opposite to each other along the axial direction.

In the method of manufacturing an optical fiber according to the above-described embodiment, the optical fiber is obtained in which the outer diameter of the cladding and the residual stress vary along the axial direction so as to be in phases opposite to each other. Therefore, it is possible to effectively expand the line width of the peak in the frequency spectrum of the scattered light due to GAWBS. Therefore, GAWBS can be suppressed. As a result, the transmission performance in long-distance transmission can be improved.

The method of manufacturing an optical fiber may further include guiding the optical fiber continuous with the glass fiber to a winder, and the guiding may include periodically varying a length of a travel path of the optical fiber to periodically vary the tension that is applied in the drawing. In this case, by varying the length of the travel path of the optical fiber, it is possible to vary the tension applied to the glass fiber.

The guiding may include periodically moving a roller configured to change a travel direction of the optical fiber to periodically vary the length of the travel path. In this case, since the optical fiber is protected by the coating layer, the optical fiber is hardly damaged by traveling on the outer peripheral surface of the roller.

The method of manufacturing an optical fiber may further include measuring at least one of the diameter and the tension of the glass fiber. In this case, the tension applied to the glass fiber can be adjusted based on the measurement result.

The method of manufacturing an optical fiber may further include gripping the optical fiber preform and inserting the optical fiber preform into a heating furnace at a constant speed. The heating may include heating the distal end portion by the heating furnace. In this case, the glass fiber can be stably drawn from the optical fiber preform.

[Details of Embodiments of the Present Disclosure]

Specific examples of an optical fiber and a method of manufacturing an optical fiber according to the present disclosure will be described below with reference to the drawings. Note that the present invention is not limited to these examples, but is defined by the scope of claims, and is intended to include meanings equivalent to the scope of claims and all modifications within the scope. In the description of the drawings, the same elements are denoted by the same reference numerals, and redundant description will be omitted.

In the present specification, when a refractive index of a certain medium is defined as n and the refractive index of pure silica glass is defined as n0, a relative refractive index difference $\Delta$ of the medium is defined as:

$$\Delta = (n/n0) - 1 \quad [\text{Math. 2}]$$

Unless otherwise stated, it is assumed that an optical fiber has a single central axis, is substantially rotationally symmetric about the central axis, and is translationally symmetric along the central axis. Constituent elements of the optical fiber, such as a core, a cladding, and a coating, are also assumed to be substantially rotationally symmetric about the central axis and translationally symmetric along the central axis unless otherwise specified. When this assumption is applicable, the physical property values of the constituent elements of the optical fiber can be defined by values in an arbitrary cross section perpendicular to the central axis. When statistical values such as an average value, a maximum value, and a percentile value of the physical property value are defined, the physical property value in the cross section is replaced with a statistical value for a set of measurement values obtained by measuring the physical property value at a predetermined spatial resolution at a spatially uniform frequency. Unless otherwise stated, the above spatial resolution is assumed as a circle with a radius of 1 µm, which is an approximation of the operating wavelength of the optical fiber.

It is said that the relative refractive index of the region has a shape of a01-th power when a radius coordinate of the optical fiber is r and the relative refractive index difference of a region between an inner radius r0 and an outer radius r1 is expressed as follows:

$$\Delta = \Delta 0 + (\Delta 1 - \Delta 0)*((r-r0)/(r1-r0))^{\wedge}\alpha 01 \qquad \text{[Math. 3]}$$

$\Delta 0$ is the relative refractive index difference at the radius r=r0, i.e., at one end of the region, and $\Delta 1$ is the relative refractive index difference at the radius r=r1, i.e., at the other end of the region.

(Optical Fiber)

Figure 1A:
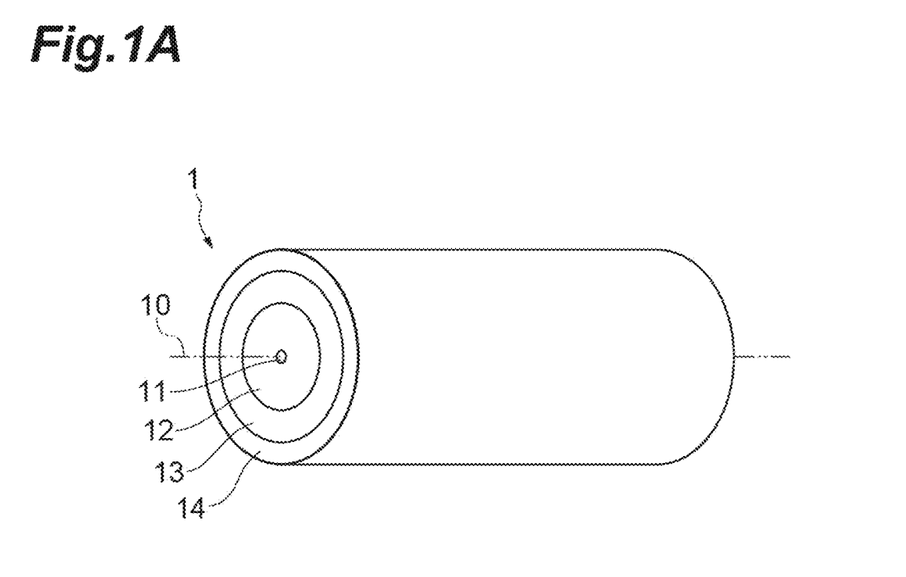
FIG. 1A is a perspective view showing a structure of an optical fiber according to an embodiment.

As shown in FIG. 1A, an optical fiber 1 includes a central axis 10, a core 11, a cladding 12, a first coating layer 13, and a second coating layer 14. Core 11 is made of glass and extends along central axis 10. Cladding 12 is made of glass, surrounds core 11, and extends along central axis 10. First coating layer 13 is made of resin, surrounds cladding 12, and extends along central axis 10. First coating layer 13 is made of, for example, an acrylate-based ultraviolet-curable resin. Second coating layer 14 is made of resin, surrounds first coating layer 13, and extends along central axis 10. Second coating layer 14 is made of, for example, an acrylate-based ultraviolet-curable resin having a higher elastic modulus than first coating layer 13.

The relative refractive index difference of core 11 is higher than the relative refractive index difference of cladding 12, and the difference is 0.2% to 2.0%. Core 11 does not include $GeO_2$ as an additive, but includes one or more additives of Cl, F, P, Br, Na, K, and Rb. Cladding 12 includes one or more of F and Cl as additives. Thus, optical fiber 1 can realize low transmission loss and is suitable for long-distance optical communication. The transmission loss is preferably 0.17 dB/km or less, more preferably 0.16 dB/km or less, and still more preferably 0.15 dB/km or less. On the other hand, when the transmission loss is 0.10 dB/km or more, the productivity can be increased.

The diameter of core 11 is 7 µm or more and 14 µm or less. The average outer diameter of cladding 12 is 123 µm or more and 127 µm or less, and more preferably 124 µm or more and 126 µm or less. The average diameter of optical fibers that have already been widely used is 125 µm. Therefore, since the average outer diameter of cladding 12 of optical fiber 1 is 125 µm, it is possible to reduce the cost required for connection with a widely used optical fiber. The outer diameter of second coating layer 14 is 170 µm or more and 270 µm or less. Thus, optical fiber 1 can achieve both sufficient mechanical strength and high-density cable accommodation.

Optical fiber 1 is manufactured by heating and drawing a distal end portion 201b (see FIG. 4) of an optical fiber preform 201. Optical fiber preform 201 is made of silica glass and has a shape similar to that of optical fiber 1 in a cross section perpendicular to the axial direction. When optical fiber 1 is drawn, tension is applied to optical fiber 1. Due to this tension and thermal shrinkage accompanying cooling of optical fiber 1 in the drawing process, stress remains in the glass (that is, core 11 and the cladding 12) of optical fiber 1 after drawing.

Figure 1B:
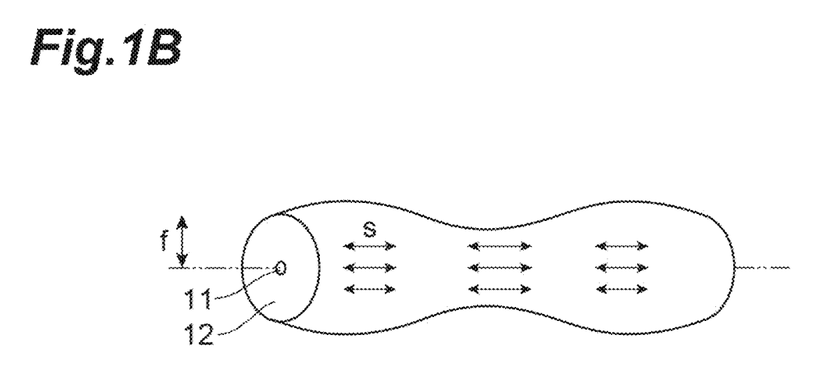
FIG. 1B is a graph showing a cladding outer diameter and a residual stress of an optical fiber according to an embodiment.
Figure 1C:
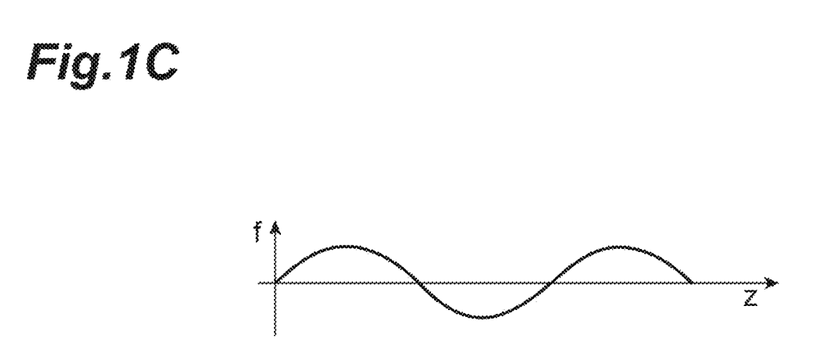
FIG. 1C is a graph showing a relationship between a position in an axial direction and a cladding outer diameter of an optical fiber according to an embodiment.

As shown in FIGS. 1B and 1C, an outer diameter f(z) of cladding 12 varies as a function of the position z in the axial direction of optical fiber 1. That is, outer diameter f(z) of cladding 12 varies along central axis 10. Hereinafter, the outer diameter of cladding 12 is also referred to as a cladding outer diameter.

When the length of optical fiber 1 is L, an average value $\langle f \rangle$ of the cladding outer diameter f(z) is defined as:

$$\langle f \rangle = \frac{1}{L}\int_0^L f(z)dz \qquad \text{[Math. 4]}$$

A deviation $\delta f$ from average value $\langle f \rangle$ of cladding outer diameter f(z) and a standard deviation $\sigma f$ are defined as:

$$\delta f = f - \langle f \rangle, \; \sigma_f = \left\{\frac{1}{L}\int_0^L \delta f^2 dz\right\}^{\frac{1}{2}} \qquad \text{[Math. 5]}$$

Figure 1D:
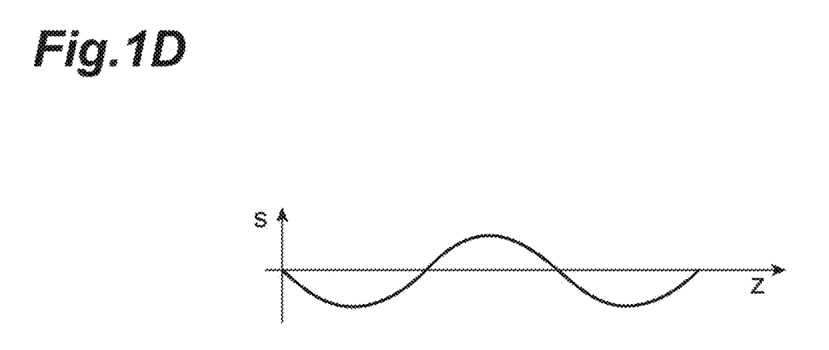
FIG. 1D is a graph showing a relationship between a position in an axial direction and a residual stress of an optical fiber according to an embodiment.

As shown in FIGS. 1B and 1D, in optical fiber 1, a residual stress s(z) in the silica glass also varies as a function of z. In other words, residual stress s(z) varies along central axis 10. In the present disclosure, residual stress s(z) in the silica glass is defined as a value of a component in a direction along central axis 10 averaged over core 11 and cladding 12 in one cross section perpendicular to central axis 10. That is, residual stress s(z) in the silica glass is defined as:

$$s(z) = \frac{2}{f(z)^2}\int_0^f s_{local}(r)r\,dr \qquad \text{[Math. 6]}$$

Regarding the sign of stress, tensile stress is positive, and compressive stress is negative. As a method for measuring the residual stress, for example, a method based on interference measurement described in Non-Patent Document 5 can be used. That is, the measurement light having controlled polarization is irradiated from a side surface of an optical fiber, and the measurement light transmitted through the optical fiber is made to interfere with reference light to measure a spatial distribution of a phase change when the measurement light is transmitted through the optical fiber, and based on the spatial distribution, distributions of a refractive index and a birefringence in a cross-section of the optical fiber are obtained. Based on this distribution, the residual stress inside the optical fiber can be measured. Non-Patent Document 5 is hereby incorporated by reference.

An average value $\langle s \rangle$ of residual stress s(z) in the silica glass is defined as:

$$\langle s \rangle = \frac{1}{L}\int_0^L s(z)dz \qquad \text{[Math. 7]}$$

A deviation $\delta s$ from average value $\langle s \rangle$ and a standard deviation $\sigma s$ of residual stress s(z) in the silica glass are defined as:

$$\delta s = s - \langle s \rangle, \qquad \text{[Math. 8]}$$
$$\sigma s = \left\{\frac{1}{L}\int_0^L \delta s^2 dz\right\}^{\frac{1}{2}}$$

As shown in FIGS. 1C and 1D, deviation δf from average value <f> of cladding outer diameter f(z) and deviation δs from average value <s> of residual stress s(z) have signs opposite to each other. Cladding outer diameter f(z) and residual stress s(z) vary along central axis 10 so as to have phases opposite to each other (a phase difference is 180 degrees when each of cladding outer diameter f(z) and residual stress s(z) is approximated by a trigonometric function).

The variation period of deviation δf is defined by the reciprocal of the centroid of the power spectrum obtained by Fourier-transforming deviation δf with respect to the position z and squaring the amplitude. The variation period of deviation δs is defined by the reciprocal of the centroid of the power spectrum obtained by Fourier-transforming deviation δs with respect to the position z and squaring the amplitude. The variation period of deviation δf and the variation period of deviation δs are equal to each other. Each variation period is preferably 0.01 m or more and 100 m or less, more preferably 0.02 m or more and 50 m or less. When each variation period is long, variation in transmission performance for each section of the transmission path increases. When each variation period is short, an increase in transmission loss due to mode coupling to higher modes occurs. Therefore, the above-mentioned range is preferable.

Figure 2A:
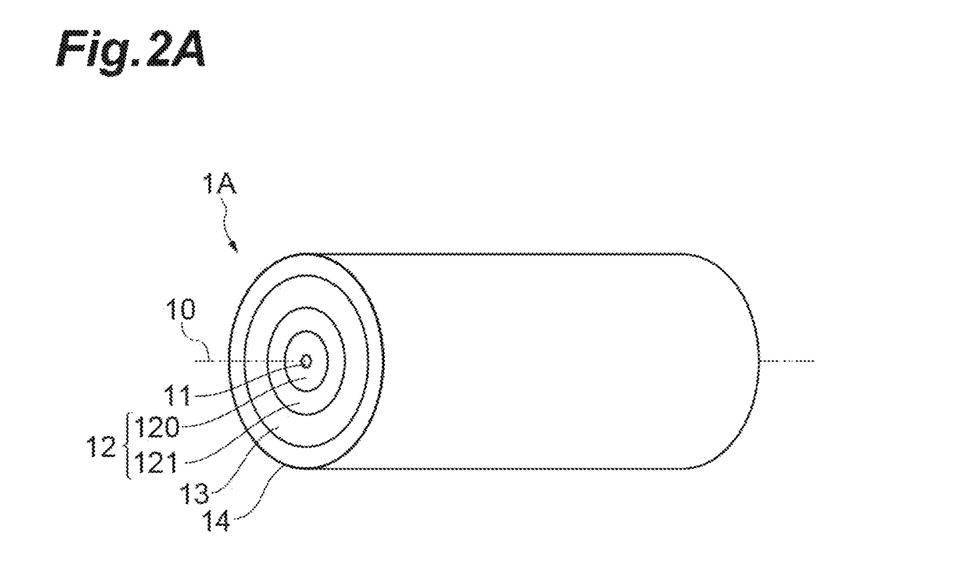
FIG. 2A is a perspective view showing a structure of an optical fiber according to a modification.
Figure 2B:
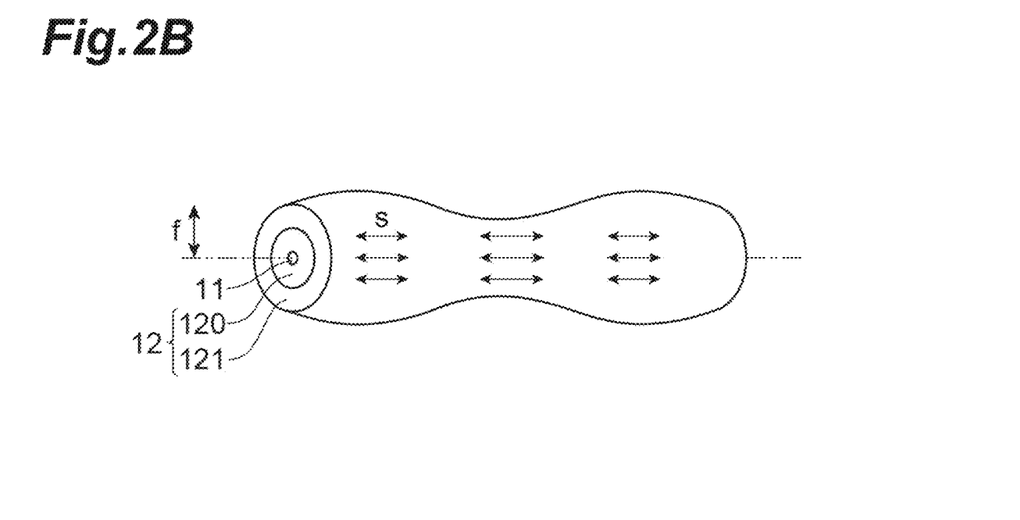
FIG. 2B is a graph showing a cladding outer diameter and a residual stress of an optical fiber according to a modification.

In addition to the above range of the variation period, it is more preferable that cladding 12 includes at least two layers of an inner cladding 120 surrounding core 11 and an outer cladding 121 surrounding inner cladding 120, and inner cladding 120 has a lower refractive index than outer cladding 121, as in an optical fiber 1A according to the modification shown in FIGS. 2A and 2B. Thus, the difference in refractive index between the fundamental waveguide mode and the higher modes can be increased. Therefore, it is possible to suppress mode coupling to the higher modes caused by a short variation period component. As a result, for example, even when micro-bending is applied to the optical fiber, an increase in transmission loss due to mode coupling can be suppressed.

When E denotes the Young's modulus averaged over core 11 and cladding 12 in a cross section perpendicular to central axis 10, and ε denotes the residual strain, since ε satisfies the equation ε=s/E, the average value <ε> of the residual strain and a deviation δε from the average are approximately expressed as:

$$\langle \varepsilon \rangle = \langle s \rangle / E \quad \text{[Math. 9]}$$

$$\delta\varepsilon = \delta s/E \quad \text{[Math. 10]}$$

As disclosed in Non-Patent Document 4, when ρ denotes density and κ denotes Poisson's ratio, the acoustic velocity Vd of a longitudinal wave in an optical fiber is expressed as:

$$V_d = \sqrt{\frac{1-\kappa}{(1+\kappa)(1-2\kappa)} \frac{E}{\rho}} \quad \text{[Math. 11]}$$

Therefore, when the differential by a distortion d/dε is expressed by a subscript "'", it can be approximated as:

$$\frac{V'_d}{V_d} = \frac{\kappa'\kappa(2-\kappa)}{(1-\kappa)(1+\kappa)(1-2\kappa)} + \frac{E'}{2E} - \frac{\rho'}{2\rho} = \Delta_\kappa + \Delta_\varepsilon + \Delta_\rho \cong 4.37 \quad \text{[Math. 12]}$$

Therefore, a deviation δVd of the sound velocity caused by deviation δs of the residual stress is expressed as:

$$\delta V_d = V'_d \cdot \delta\varepsilon = \frac{V'_d}{V_d} \cdot \frac{V_d}{E} \delta s \cong 4.37 \cdot V_d \cdot \delta s / E \quad \text{[Math. 13]}$$

As disclosed in Non-Patent Document 1, a frequency Ωm of the m-th peak in the spectrum of scattered light by GAWBS is given as follows. Designating the velocity of the longitudinal wave of the corresponding acoustic wave mode as Vd and the velocity of the transverse wave as Vs, and defining the sound velocity ratio as α=Vs/Vd, $$(1-\alpha^2)J_0(y)-\alpha^2 J_2(y)=0 \quad \text{[Math. 14]}$$

where y=ym is the m-th zero point, and frequency Ωm of the m-th peak is expressed as follows:

$$\Omega_m = 2V_d y_m/f$$

Therefore, when cladding outer diameter f and residual stress s are varied along central axis 10, a deviation δΩm occurring at the m-th peak frequency is expressed as:

[Math. 16]

$$\frac{\delta\Omega_m}{\Omega_m} = \frac{\delta V_d}{V_d} - \frac{\delta f}{f} = \frac{V'_d}{V_d} \cdot \frac{\delta s}{E} - \frac{\delta f}{f} \cong 4.37 \cdot \frac{\delta s}{E} - \frac{\delta f}{f} \quad (A)$$

By longitudinally varying frequency Ωm of the m-th peak to about ½ or more of full-width at half maximum ΔΩm of the line width, the effective line width can be expanded in the case where the fiber length including the longitudinal variation is regarded as a uniform fiber. In other words, the line width of optical fiber 1 can be effectively increased by varying peak frequency Ωm along central axis 10 and setting the amount of its amount of variation to about ½ or more of full-width at half maximum ΔΩm.

Non-Patent Document 3 discloses that the signal-to-noise ratio due to GAWBS decreases as the line width of the peak in the spectrum of scattered light due to GAWBS decreases. That is, by effectively increasing the line width, it is possible to suppress a decrease in the signal-to-noise ratio due to GAWBS. As indicated by the expression (A), the deviation from the average value of the residual stress and the deviation from the average value of the cladding outer diameter are varied in the longitudinal direction so as to have signs opposite to each other, whereby the effective line width of GAWBS can be more effectively expanded.

On the other hand, when the variation in the cladding outer diameter of optical fiber 1 is excessively large, a connection loss in a connection using a ferrule and a V-groove as alignment means becomes large. In addition, it becomes difficult to detect anomalies such as bubbles in the glass based on measurements of the cladding outer diameter. Therefore, triple of the standard deviation (3σ) of the deviation of the cladding outer diameter may be 1.0 μm or less, more preferably 0.5 μm or less. When the residual stress is excessively large, a breaking strength may decrease and the connection loss due to a decrease in flatness of an end surface when optical fiber 1 is cleaved may increase. Therefore, triple of the standard deviation (3σ) of the deviation of the residual stress may be 150 MPa or less, more preferably 100 MPa.

Figure 3:
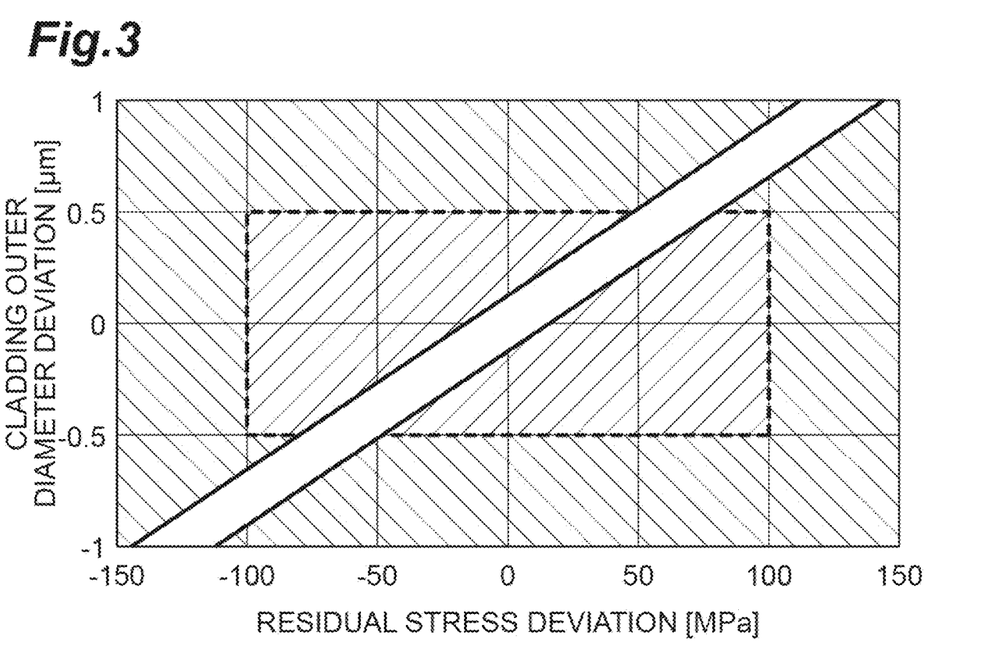
FIG. 3 is a graph showing a range in which an effective line width is enlarged to ½ or more of a full-width at half maximum and adverse effects caused by an excessive deviation of a cladding outer diameter and an excessive deviation of a residual stress are suppressed.

FIG. 3 is a graph showing a range in which the effective line width is expanded to ½ or more of the full-width at half maximum and adverse effects caused by excessive deviation of the cladding outer diameter and excessive deviation of the residual stress are suppressed. The horizontal axis of FIG. 3 represents residual stress deviation [MPa], and the vertical axis of FIG. 3 represents cladding outer diameter deviation [μm]. FIG. 3 shows the characteristics of GAWBS when there is no variation in the cladding outer diameter or residual stress in the longitudinal direction of the optical fiber, where the peak frequency is 500 MHz and the full-width at half maximum of the line width is 1 MHz based on Non-Patent Document 1.

Specifically, a range satisfying the following condition (1) is preferable, and a range satisfying the condition (2) is more preferable.

Condition (1)

$$|\delta f/[\mu m] - 0.0078 \cdot (\delta \sigma/[MPa])| \geq 0.125, |\delta f/[\mu m]| \leq 1, |(\delta \sigma/[MPa])| \leq 150 \qquad [\text{Math. 17}]$$

Condition (2)

$$|\delta f/[\mu m] - 0.0078 \cdot (\delta \sigma/[MPa])| \geq 0.125, |\delta f/[\mu m]| \leq 0.5, |(\delta \sigma/[MPa])| \leq 100 \qquad [\text{Math. 18}]$$

In order to expand the line width of the peak of the frequency spectrum of the scattered light due to GAWBS, it is further preferable to eliminate the degeneracy of the acoustic modes by giving non-circularity to the outer diameter of cladding 12 of optical fiber 1 to eliminate rotational symmetry, in addition to the variations in opposite phases of the cladding outer diameter and the residual stress as described above. Specifically, the cladding non-circularity may be 0.1% or more, and more preferably 0.2% or more. On the other hand, since an excessive cladding non-circularity increases the connection loss, the cladding non-circularity may be 1.5% or less, more preferably 1% or less. Here, the outer diameter of cladding 12 being non-circular means that the outer peripheral portion of cladding 12 is not a perfect circle. The cladding non-circularity is a value obtained by dividing a length difference between a major axis and a minor axis by a length of the major axis in case the outer peripheral portion of cladding 12 is elliptically approximated.

When core 11 is eccentric from the centroid of cladding 12, the overlap between the mode amplitude of the acoustic wave and the mode amplitude of the optical field is reduced. Accordingly, it is possible to expand the line width of the peak of the frequency spectrum of the scattered light due to GAWBS. Specifically, the core eccentricity may be 0.1 μm or more, and more preferably 0.2 μm or more. On the other hand, excessive core eccentricity increases the connection loss. Therefore, the core eccentricity may be 1.0 μm or less, more preferably 0.8 μm or less.

In optical fiber 1, when the monochromatic light is propagated through core 11, the line width of the peak at over 500 MHz in the frequency spectrum of the scattered light that is scattered forward by the acoustic wave thermally excited in optical fiber 1 and propagates through core 11 is larger than 1.5 MHz.

(Method of Manufacturing Optical Fiber)

Figure 4:
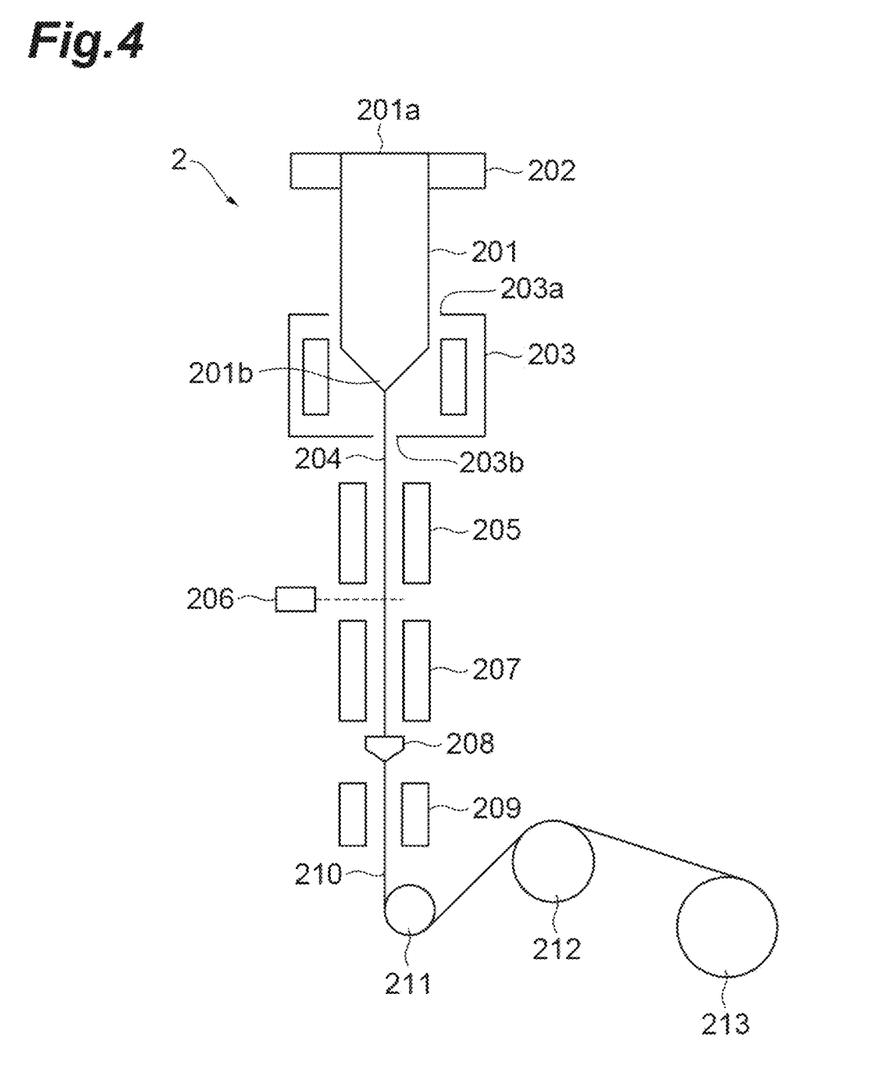
FIG. 4 is a configuration diagram of manufacturing apparatus of an optical fiber according to an embodiment.
Figure 5:
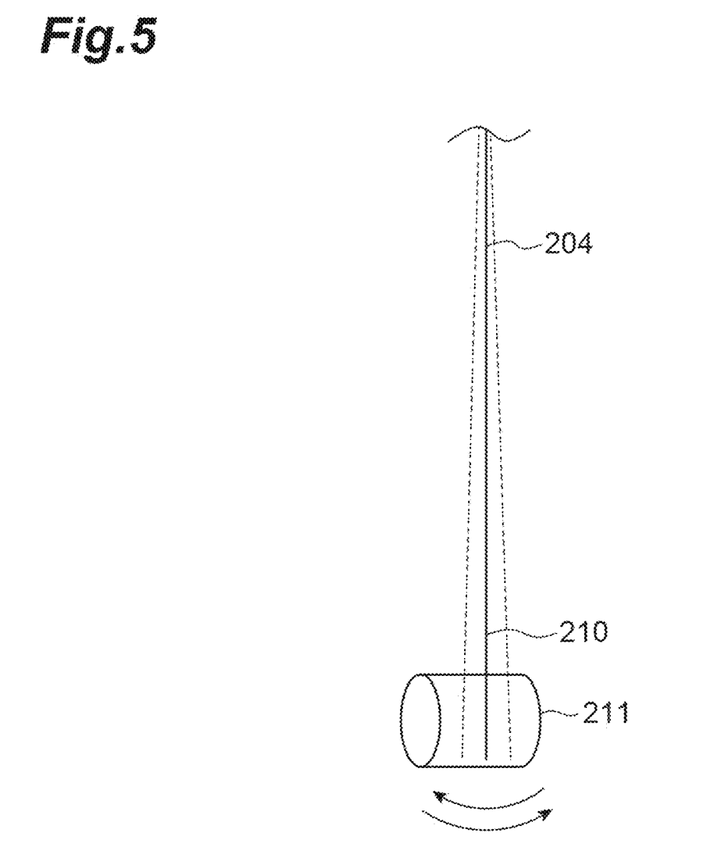
FIG. 5 is a view for explaining an operation of a roller.

Hereinafter, a manufacturing method of optical fiber 1 according to the embodiment will be described. FIG. 4 is a configuration diagram of a manufacturing apparatus of the optical fiber according to the embodiment. FIG. 5 is a view for explaining an operation of a roller. A manufacturing apparatus 2 shown in FIG. 4 is an apparatus for manufacturing optical fiber 1 from optical fiber preform 201 via a glass fiber 204. Manufacturing apparatus 2 includes a grip portion 202, a heating furnace 203, a heat retaining furnace 205, a measurer 206, a cooler 207, a die 208, an ultraviolet irradiator 209, a roller 211, a capstan 212, and a winder 213.

Grip portion 202 grips optical fiber preform 201 and feeds it into heating furnace 203 at a constant speed. Optical fiber preform 201 includes a proximal end portion 201a gripped by grip portion 202 and distal end portion 201b inserted into heating furnace 203. Grip portion 202 functions as a supply portion that supplies optical fiber preform 201 to heating furnace 203.

Heating furnace 203 has an opening 203a into which optical fiber preform 201 is inserted, and an opening 203b from which glass fiber 204 is drawn out, the opening 203b facing opening 203a. Heating furnace 203 heats and softens distal end portion 201b of optical fiber preform 201 supplied into heating furnace 203. Glass fiber 204 is drawn out from distal end portion 201b softened by heating. Glass fiber 204 is drawn out of heating furnace 203 through opening 203b.

Heat retaining furnace 205 keeps glass fiber 204 warm and relaxes a structure of glass. Measurer 206 measures at least one of a diameter and a tension of glass fiber 204 in a state in which the structure of glass is relaxed. Examples of measurer 206 include a measurer that measures the diameter by irradiating glass fiber 204 with a laser and a measurer that measures tension by irradiating glass fiber 204 with an ultrasonic wave.

Cooler 207 is disposed downstream of measurer 206 and cools glass fiber 204. Die 208 applies resin to the outer peripheral surface of inserted glass fiber 204 to form a coating resin. The resin includes an acrylate-based ultraviolet-curable resin. Ultraviolet irradiator 209 irradiates the coating resin formed on glass fiber 204 with ultraviolet rays to cure the coating resin. Thus, the glass fiber is coated with the resin. As a result, an optical fiber 210 is manufactured.

Although one set of die 208 and ultraviolet irradiator 209 is shown in FIG. 4, manufacturing apparatus 2 may include two sets of die 208 and ultraviolet irradiator 209 disposed along the axial direction of glass fiber 204. In this case, die 208 and ultraviolet irradiator 209 disposed upstream function as a first coating layer forming unit that forms first coating layer 13. Die 208 and ultraviolet irradiator 209 disposed downstream function as a second coating layer forming unit that forms second coating layer 14. As a result, first coating layer 13 and second coating layer 14 are formed to obtain optical fiber 1.

Roller 211 changes a travel direction of optical fiber 1. Roller 211 moves to change the angle or position of roller 211. Accordingly, the lengths of the travel paths (path lines) of optical fiber 1 and glass fiber 204 from distal end portion 201b to winder 213 periodically vary.

As shown in FIG. 5, roller 211 reciprocates, for example, along the axial direction of roller 211. In this case, the travel position of optical fiber 1 on the outer peripheral surface of roller 211 reciprocates between one end side and the other end side in the axial direction of roller 211. Accordingly, the drawing direction and the drawing angle of glass fiber 204 from distal end portion 201b of optical fiber preform 201 also change periodically. The drawing angle is an angle formed by the drawing direction of glass fiber 204 and the axial direction of optical fiber preform 201.

The lengths of the travel paths of optical fiber 1 and glass fiber 204 become shorter when optical fiber 1 travels at the center of roller 211 in the axial direction, and become longer when optical fiber 1 travels at one end side and the other end side. In a process in which the travel path becomes longer, the tension applied to glass fiber 204 increases. Therefore, as the diameter of glass fiber 204 is reduced, the residual stress of glass fiber 204 is increased. Accordingly, as the cladding outer diameter is reduced, the residual stress of optical fiber 1 in the direction along central axis 10 is increased.

On the other hand, in a process in which the travel path is shortened, the tension applied to glass fiber 204 is reduced. As the diameter of glass fiber 204 is increased, the residual stress of glass fiber 204 is decreased. Accordingly, as the cladding outer diameter is increased, the residual stress of optical fiber 1 in the direction along central axis 10 is reduced. As a result, optical fiber 1 having longitudinal variations in cladding outer diameter and residual stress is obtained. That is, optical fiber 1 is obtained in which the cladding outer diameter and the residual stress vary along central axis 10 so as to be in phases opposite to each other.

Roller 211 guides optical fiber 1 to capstan 212 while periodically varying the lengths of the travel paths of glass fiber 204 and optical fiber 1 as described above. As a result, roller 211 imparts a longitudinal variation of opposite phase between the cladding outer diameter and the residual stress of optical fiber 1. For example, roller 211 may move along central axis 10 of optical fiber 1 to periodically vary only the length of the travel path of optical fiber 1 while maintaining the length of the travel path of glass fiber 204. In this case, both the drawing direction and the drawing angle of glass fiber 204 are maintained. Even in this case, the tension applied to glass fiber 204 varies as a result of a variation in the length of the travel path of optical fiber 1. Therefore, the tension applied to glass fiber 204 can be periodically varied.

The period of varying the lengths of the travel paths is 0.01 m or more and 100 m or less, more preferably 0.02 m or more and 50 m or less in terms of the lengths of optical fiber 1. This makes it possible to enhance the effect of suppressing GAWBS. For this purpose, for example, while optical fiber 1 is drawn at 50 m/s, the position or angle of roller 211 is varied by 0.5 Hz or more, more preferably by 1 Hz or more.

Capstan 212 pulls optical fiber 1 at a predetermined speed and tension. Winder 213 winds optical fiber 1 pulled by capstan 212.

Figure 6:
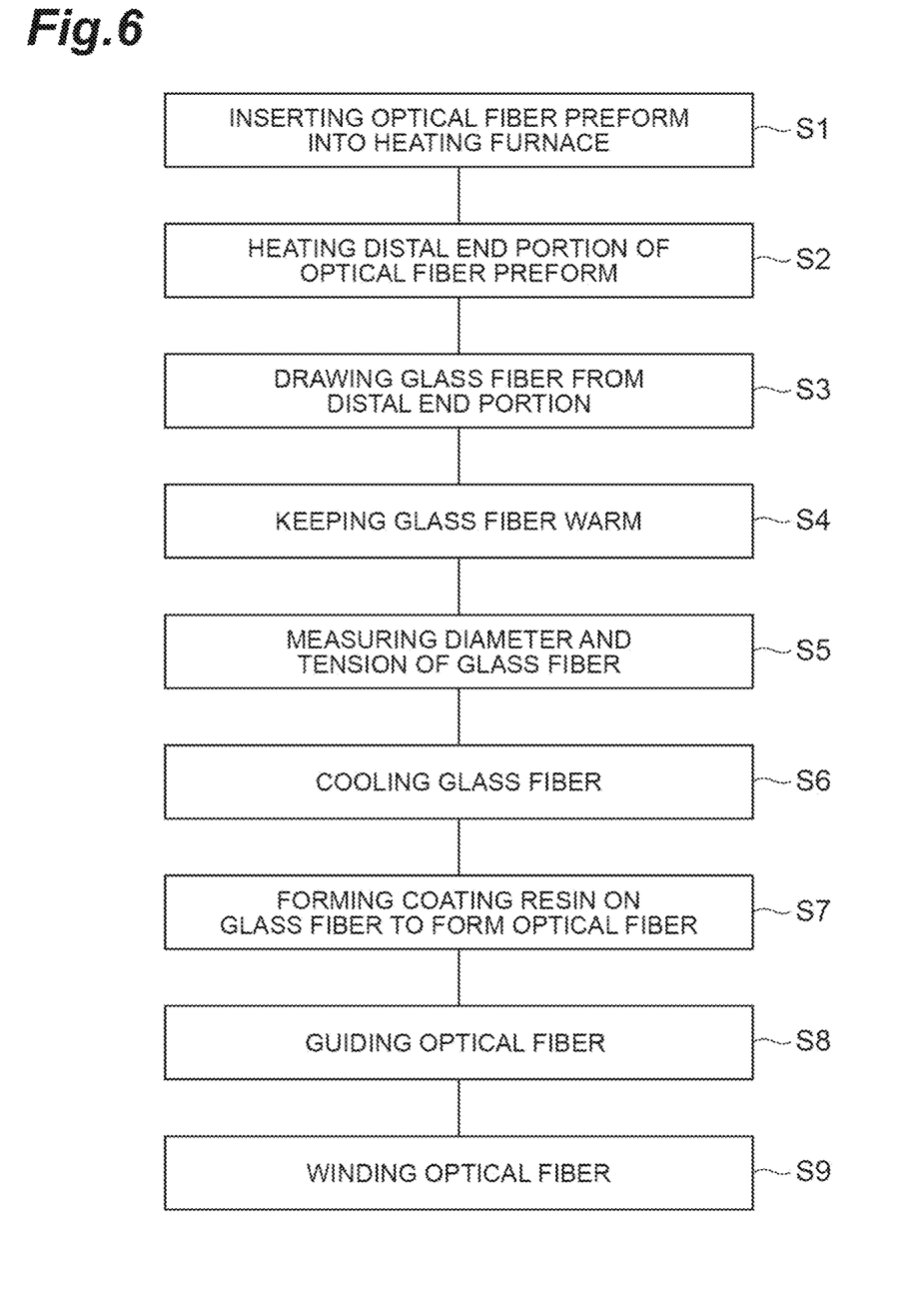
FIG. 6 is a flowchart showing a method of manufacturing an optical fiber according to an embodiment.

FIG. 6 is a flowchart showing a method of manufacturing an optical fiber according to an embodiment. The method of manufacturing optical fiber 1 includes a step S1 of inserting optical fiber preform 201 into heating furnace 203, a step S2 of heating distal end portion 201b of optical fiber preform 201, a step S3 of drawing glass fiber 204 from the distal end portion 201b, a step S4 of keeping glass fiber 204 warm, a step S5 of measuring at least one of diameters and tensions of glass fiber 204, a step S6 of cooling glass fiber 204, a step S7 of forming a coating resin on glass fiber 204 to form optical fiber 1, a step S8 of guiding optical fiber 1, and a step S9 of winding optical fiber 1.

In step S1, optical fiber preform 201 is inserted into heating furnace 203 at a constant speed by grip portion 202. In the optical fiber preform 201, distal end portion 201b is fed into heating furnace 203 through opening 203a of heating furnace 203 in a state in which proximal end portion 201a is gripped. In step S2, distal end portion 201b is heated and softened by heating furnace 203.

In step S3, glass fiber 204 is drawn out from distal end portion 201b softened by heating through opening 203b. In step S3, by periodically varying the tension applied to glass fiber 204, the diameter of glass fiber 204 and the residual stress in the axial direction of glass fiber 204 are varied so as to have phases opposite to each other along the axial direction. The insertion speed of optical fiber preform 201 in step S1 can be set according to the drawing speed of glass fiber 204 in step S3.

In step S4, heat retaining furnace 205 keeps drawn glass fiber 204 warm. Thereby, the structure of glass is relaxed. In step S5, at least one of diameter and tension of glass fiber 204 is measured by measurer 206. In step S6, glass fiber 204 is cooled.

In step S7, at first, resin is applied to the outer peripheral surface of glass fiber 204 by die 208 to form a coating resin. Subsequently, the coating resin is cured by ultraviolet rays irradiated from ultraviolet irradiator 209. By repeating step S7, first coating layer 13 and second coating layer 14 are formed, and as a result, optical fiber 1 is obtained.

In step S8, optical fiber 1 continuous with glass fiber 204 is pulled at a predetermined speed and tension by capstan 212, travels on the outer peripheral surface of roller 211, and is then guided to winder 213. The travel direction of optical fiber 1 is changed by roller 211. In step S8, the tension applied to glass fiber 204 in step S3 is periodically varied by periodically varying at least the length of the travel path of optical fiber 1. In step S8, roller 211 is periodically moved to periodically vary the travel path length of optical fiber 1. In step S8, the sum of the lengths of the travel paths of glass fiber 204 and optical fiber 1 is periodically varied.

The variation in the cladding outer diameter and the residual stress is caused by the movement of roller 211 and the change in the pulling speed by capstan 212. Therefore, based on the cladding outer diameter or tension measured at measurer 206, the movement of roller 211 and the rotation of capstan 212 can be controlled such that the variation range thereof falls within a target range.

The period in which the lengths of the travel paths of glass fiber 204 and optical fiber 1 are varied is 0.01 m or more and 100 m or less, more preferably 0.02 m or more and 50 m or less in terms of the length of optical fiber 1. Thus, the effect of suppressing GAWBS is improved.

In order to vary the lengths of the travel paths of glass fiber 204 and optical fiber 1 in such a period, for example, the position or angle of roller 211 may be changed in a range of 0.5 Hz or more and 5 kHz or less, and more preferably in a range of 1 Hz or more and 2.5 kHz or less, while drawing optical fiber 1 at 50 m/s.

In step S9, optical fiber 1 is wound by winder 213.

As described above, in optical fiber 1, the cladding outer diameter and the residual stress vary along central axis 10 of optical fiber 1, and deviation $\delta f$ of cladding outer diameter f(z) from average value $<f>$ and deviation $\delta s$ of residual stress s(z) from average value $<s>$ have signs opposite to each other. Therefore, it is possible to effectively expand the line width of the peak of the frequency spectrum of the scattered light due to GAWBS. Thus, GAWBS can be suppressed. As a result, the transmission performance in long-distance transmission can be improved.

Cladding outer diameter f(z) and residual stress s(z) vary in phases opposite to each other along central axis 10. Therefore, deviation $\delta f$ of cladding outer diameter f(z) from average value $<f>$ and deviation $\delta s$ of residual stress s(z) from average value $<s>$ can have signs opposite to each other.

When the monochromatic light is propagated through core 11, the line width of the peak of the frequency spectrum of the scattered light that is scattered forward by the acoustic wave thermally excited in optical fiber 1 and propagates through core 11 is larger than 1.5 MHz. Therefore, GAWBS can be reliably suppressed.

In optical fiber 1, the above condition (1) is satisfied. Therefore, it is possible to suppress adverse effects caused by excessive deviation of the cladding outer diameter and excessive deviation of the residual stress.

In the manufacturing method of optical fiber 1, by periodically varying tension applied to glass fiber 204 in step S3, the diameter of glass fiber 204 and the residual stress in the axial direction of glass fiber 204 are varied so as to be in phases opposite to each other along the axial direction. As a result, optical fiber 1 is obtained in which the cladding outer diameter and the residual stress vary along the axial direction so as to be in phases opposite to each other. Therefore, it is possible to effectively expand the line width of the peak of the frequency spectrum of the scattered light due to GAWBS. Therefore, GAWBS can be suppressed. As a result, the transmission performance in long-distance transmission can be improved.

In step S8, the tension applied in step S3 is periodically varied by periodically varying the length of the travel path of optical fiber 1. Therefore, by varying the length of the travel path of optical fiber 1, the tension applied to the glass fiber can be indirectly varied.

In step S8, roller 211 for changing the travel direction of optical fiber 1 is periodically moved to periodically vary the travel path length of optical fiber 1. If a roller for changing the travel direction of glass fiber 204 is provided and the tension applied to glass fiber 204 is varied by the movement of the roller, glass fiber 204 may be damaged by the contact with the roller. Since optical fiber 1 is protected by first coating layer 13 and second coating layer 14, it is hard to be damaged by roller 211.

Since the manufacturing method of optical fiber 1 includes step S5, it is possible to adjust the tension applied to glass fiber 204 based on the measurement result of at least one of the diameter and the tension of glass fiber 204.

Since the manufacturing method of optical fiber 1 includes step S1, glass fiber 204 can be stably drawn from optical fiber preform 201.

REFERENCE SIGNS LIST 1, 1A optical fiber
2 manufacturing apparatus
10 central axis
11 core
12 cladding
13 first coating layer
14 second coating layer
201 optical fiber preform
201a proximal end portion
201b distal end portion
202 grip portion
203 heating furnace
203a opening
203b opening
204 glass fiber
205 heat retaining furnace
206 measurer
207 cooler
208 die
209 ultraviolet irradiator
211 roller
212 capstan
213 winder

The invention claimed is:

1. An optical fiber having a central axis, comprising:
a core made of silica glass and extending along the central axis;
a cladding made of silica glass, surrounding the core, and extending along the central axis; and
a coating layer made of resin, surrounding the cladding, and extending along the central axis,
wherein a diameter of the core is 7 μm or more and 14 μm or less,
wherein an outer diameter of the cladding varies along the central axis,
wherein a residual stress in a direction along the central axis varies along the central axis, the residual stress being averaged over the core and the cladding in a cross section perpendicular to the central axis,
wherein a deviation from an average value of the outer diameter and a deviation from an average value of the residual stress have signs opposite to each other,
wherein the cladding includes an inner cladding surrounding the core and an outer cladding surrounding the inner cladding, and
wherein a refractive index of the inner cladding is lower than a refractive index of the outer cladding.

2. The optical fiber according to claim 1,
wherein the outer diameter and the residual stress vary along the central axis so as to be in phases opposite to each other.

3. The optical fiber according to claim 1,
wherein, when monochromatic light propagates through the core, a line width of a peak of a frequency spectrum of scattered light that is scattered forward by an acoustic wave thermally excited in the optical fiber and that propagates through the core is more than 1.5 MHz.

4. The optical fiber according to claim 1,
wherein following expressions are satisfied substantially over an entire length, where $\delta f$ denotes the deviation of the outer diameter and $\delta\sigma$ denotes the deviation of the residual stress $|\delta f/[\mu m]-0.0078\cdot(\delta\sigma/[MPa])|\geq 0.125$, $|\delta f/[\mu m]|\leq 1$, $|(\delta\sigma/[MPa])|\leq 150$.

5. The optical fiber according to claim 1,
wherein a variation period of the deviation of the outer diameter and a variation period of the deviation of the residual stress each are 0.01 m or more and 100 m or less.

6. The optical fiber according to claim 1,
wherein a triple of a standard deviation of the deviation of the outer diameter is 1.0 μm or less.

7. The optical fiber according to claim 1,
wherein a triple of a standard deviation of the deviation of the residual stress is 150 MPa or less.

8. The optical fiber according to claim 1,
wherein a non-circularity of the cladding is 0.1% or more and 1.5% or less.

9. The optical fiber according to claim 1,
wherein a transmission loss is 0.17 dB/km or less.

* * * * *